United States Patent
Xia et al.

(10) Patent No.: US 12,079,965 B2
(45) Date of Patent: Sep. 3, 2024

(54) DATA NOISE REDUCTION METHOD AND APPARATUS

(71) Applicant: Beijing Sankuai Online Technology Co., Ltd., Beijing (CN)

(72) Inventors: Huaxia Xia, Beijing (CN); Zeyu Zhong, Beijing (CN); Shenchuan Liu, Beijing (CN)

(73) Assignee: BEIJING SANKUAI ONLINE TECHNOLOGY CO., LTD., Beijing (CN)

( * ) Notice: Subject to any disclaimer, the term of this patent is extended or adjusted under 35 U.S.C. 154(b) by 425 days.

(21) Appl. No.: 17/667,549

(22) Filed: Feb. 9, 2022

(65) Prior Publication Data

US 2022/0318957 A1    Oct. 6, 2022

(30) Foreign Application Priority Data

Mar. 30, 2021 (CN) .......................... 202110336820.8

(51) Int. Cl.
*G06T 5/70* (2024.01)
*G01S 17/89* (2020.01)
*G06V 10/25* (2022.01)

(52) U.S. Cl.
CPC .............. *G06T 5/70* (2024.01); *G01S 17/89* (2013.01); *G06V 10/25* (2022.01); *G06T 2207/10028* (2013.01)

(58) Field of Classification Search
CPC ................... G01S 17/89; G01S 7/4802; G06T 2207/10028; G06T 2207/20084;
(Continued)

(56) References Cited

U.S. PATENT DOCUMENTS 3,963,347 A * 6/1976 Segre ...................... G01W 1/00
372/15
4,960,330 A * 10/1990 Kerschmann ............ G01N 1/06
356/36
(Continued)

FOREIGN PATENT DOCUMENTS

CN    110031823 A    7/2019
CN    110136072 A    8/2019
(Continued)

OTHER PUBLICATIONS

State Intellectual Property Office of the People's Republic of China, Office Action and Search Report Issued in Application No. 2021103368208, May 12, 2021, 13 pages. (Submitted with Machine/Partial Translation).
(Continued)

*Primary Examiner* — Tsung Yin Tsai
(74) *Attorney, Agent, or Firm* — Kilpatrick Townsend & Stockton LLP (57) ABSTRACT

A data noise reduction method and apparatus are provided. In some embodiments, the method includes: obtaining to-be-processed point cloud data; for each of points in the to-be-processed point cloud data, determining a point feature corresponding to the point, the point feature comprising at least one of a spatial distribution difference feature between the point and other points adjacent to the point or a point group distribution feature corresponding to a point group comprising all points in a local space in which the point is located; recognizing a noise point from the to-be-processed point cloud data according to point features corresponding to the points in the to-be-processed point cloud data; and performing noise reduction on the to-be-processed point cloud data according to the recognized noise point.

19 Claims, 4 Drawing Sheets

(58) Field of Classification Search
CPC .. G06T 5/60; G06T 5/70; G06V 10/25; G06V 10/30; G06V 20/56; G06V 20/64
See application file for complete search history.

(56) References Cited

U.S. PATENT DOCUMENTS

| | | | | |
|---|---|---|---|---|
| 5,656,813 | A | * | 8/1997 | Moore ............... G01N 21/3504 250/338.5 |
| 9,300,841 | B2 | * | 3/2016 | Askan ...................... H04N 1/38 |
| 2004/0120549 | A1 | * | 6/2004 | Wong ..................... G01S 17/89 382/106 |
| 2015/0071566 | A1 | | 3/2015 | Goodman |
| 2017/0220887 | A1 | * | 8/2017 | Fathi ...................... G06V 20/70 |
| 2019/0156472 | A1 | * | 5/2019 | Link .................. G01N 21/8851 |
| 2020/0029490 | A1 | * | 1/2020 | Bertucci ................ G06V 20/58 |
| 2020/0342581 | A1 | * | 10/2020 | Link .......................... G06T 7/75 |
| 2021/0089040 | A1 | * | 3/2021 | Ebrahimi Afrouzi ....................... A47L 9/2873 |
| 2021/0302584 | A1 | * | 9/2021 | Luo ........................... G06T 7/73 |
| 2022/0075032 | A1 | * | 3/2022 | Wang ..................... G01S 7/499 |

FOREIGN PATENT DOCUMENTS

| | | |
|---|---|---|
| CN | 110568454 A | 12/2019 |
| CN | 111291697 A | 6/2020 |
| CN | 112102178 A | 12/2020 |
| CN | 112136018 A | 12/2020 |
| CN | 112213735 A | 1/2021 |
| CN | 112435329 A | 3/2021 |

OTHER PUBLICATIONS

State Intellectual Property Office of the People's Republic of China, Office Action and Search Report Issued in Application No. 2021103368208, Jun. 8, 2021, 14 pages. (Submitted with Machine/Partial Translation).

\* cited by examiner

DATA NOISE REDUCTION METHOD AND APPARATUS

CROSS REFERENCE TO RELATED APPLICATIONS

The present application claims priority to Chinese Patent Application No. 2021103368208, filed on Mar. 30, 2021, which is incorporated herein by reference in its entirety.

TECHNICAL FIELD

This disclosure relates to the field of unmanned driving technologies, and in particular, to a data noise reduction method and apparatus.

BACKGROUND

In the unmanned driving field, obtaining point cloud data by using a laser radar is one of important means for an unmanned driving device to perceive a surrounding environment. In normal cases, particles such as rain and fog, dust, vehicle exhaust, raised dust, haze, and sand in the environment may not cause damage to the unmanned driving device, and the unmanned driving device can pass through these particles. However, due to inherent characteristics of the laser radar, when a light beam is emitted onto these particles, the light beam may be reflected, and the unmanned driving device may recognize these particles as obstacles affecting normal traveling of the unmanned driving device, which further leads to abnormal operations such as errors in decision-making of a decision-making algorithm and occurrence of sudden brakes, thereby affecting the normal traveling of the unmanned driving device.

However, point cloud data of these particles cannot be effectively wiped currently to avoid occurrence of errors in decision-making.

SUMMARY

A data noise reduction method and apparatus is provided, to address problems in existing technologies.

The following technical solutions are described in accordance with the disclosure:

This disclosure provides a data noise reduction method, including:

obtaining to-be-processed point cloud data;

for each of points in the to-be-processed point cloud data, determining a point feature corresponding to the point, the point feature comprising at least one of a spatial distribution difference feature between the point and other points adjacent to the point or a point group distribution feature corresponding to a point group comprising all points in a local space in which the point is located;

recognizing a noise point from the to-be-processed point cloud data according to point features corresponding to the points in the to-be-processed point cloud data; and performing noise reduction on the to-be-processed point cloud data according to the recognized noise point.

This disclosure provides an unmanned driving device, including a memory, a processor, and a computer program stored in the memory and executable on the processor, the processor, when executing the program, implementing operations: obtaining to-be-processed point cloud data; for each of points in the to-be-processed point cloud data, determining a point feature corresponding to the point, the point feature comprising at least one of a spatial distribution difference feature between the point and other points adjacent to the point or a point group distribution feature corresponding to a point group comprising all points in a local space in which the point is located; recognizing a noise point from the to-be-processed point cloud data according to point features corresponding to the points in the to-be-processed point cloud data; and performing noise reduction on the to-be-processed point cloud data according to the recognized noise point.

This disclosure provides a computer-readable storage medium, storing a computer program, the computer program, when executed by a processor, implementing operations: obtaining to-be-processed point cloud data; for each of points in the to-be-processed point cloud data, determining a point feature corresponding to the point, the point feature comprising at least one of a spatial distribution difference feature between the point and other points adjacent to the point or a point group distribution feature corresponding to a point group comprising all points in a local space in which the point is located; recognizing a noise point from the to-be-processed point cloud data according to point features corresponding to the points in the to-be-processed point cloud data; and performing noise reduction on the to-be-processed point cloud data according to the recognized noise point.

The at least one technical solution adopted in this disclosure can achieve the following beneficial effects:

In the data noise reduction method provided in this disclosure, to-be-processed point cloud data is obtained; for each point included in the to-be-processed point cloud data, a point feature corresponding to the point is then determined, where the point feature may include at least one of a spatial distribution difference feature between the point and every other adjacent point and a point group distribution feature corresponding to a point group including all points included in a local space in which the point is located; and noise is recognized from the to-be-processed point cloud data according to the point feature corresponding to each point in the to-be-processed point cloud data, and noise reduction is further performed on the to-be-processed point cloud data according to the recognized noise point.

As can be seen from the foregoing method, in this method, after the to-be-processed point cloud data is obtained, noise with a relatively loose distribution condition compared with real obstacles may be recognized from the point cloud data according to an attribute feature of each point in the point cloud data, a distribution difference feature between each point in space, and a distribution condition of the attribute feature of each point in space, and noise reduction is performed, to reduce the quantity of noise included in the point cloud data, to further reduce an impact of point cloud data of micro particles such as rain, snow, or raised dust on a decision-making result of a decision-making algorithm, thereby improving the accuracy of decision-making of the decision-making algorithm.

BRIEF DESCRIPTION OF THE DRAWINGS

Accompanying drawings described herein are used for providing further understanding about this disclosure, and constitute a part of this disclosure. Exemplary embodiments of this disclosure and descriptions thereof are used for explaining this disclosure, and do not constitute an inappropriate limitation on this disclosure. In the accompanying drawings.

DETAILED DESCRIPTION OF THE EMBODIMENTS

To make the objectives, technical solutions, and advantages of this disclosure clearer, the technical solutions in accordance with this disclosure will be described below with reference to embodiments of this disclosure and corresponding accompanying drawings. Apparently, the described embodiments are merely some but not all of the embodiments, and thus are not intended to be limiting. All other embodiments obtained by a person of ordinary skill in the art based on the embodiments of this disclosure without creative efforts shall fall within the protection scope of this disclosure.

Figure 1:
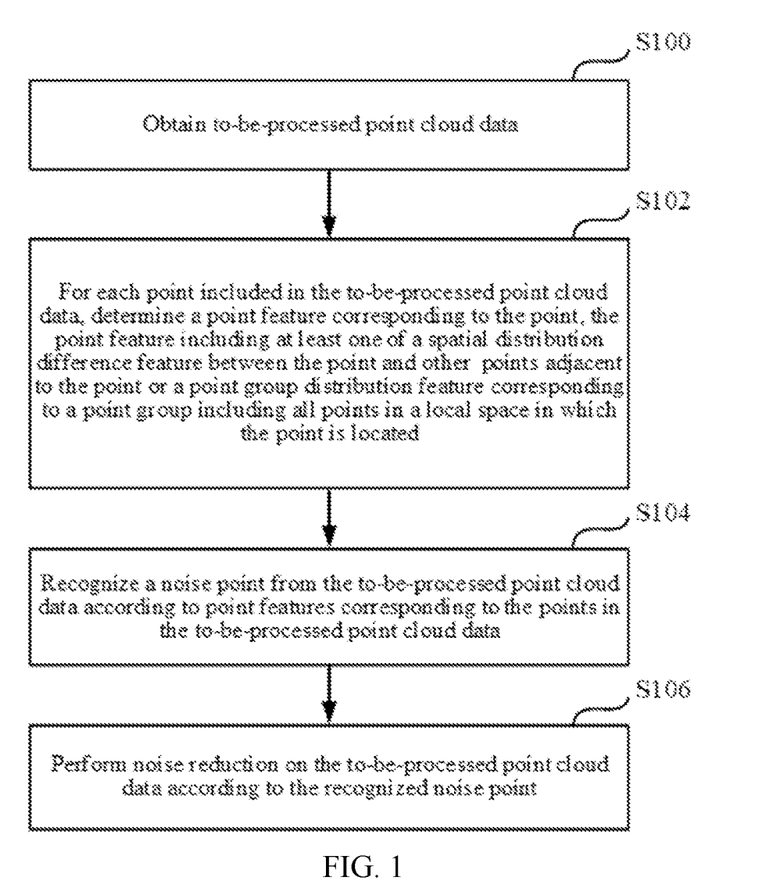
FIG. 1 is a schematic flowchart of a data noise reduction method in this disclosure.

FIG. 1 is a schematic flowchart of a data noise reduction method in this disclosure, and specifically includes the following steps:

Step S100: Obtaining to-be-processed point cloud data.

To resolve a problem that a visual navigation system mounted on an unmanned driving device recognizes micro particles such as rain, snow, or raised dust as obstacles and further leads to decision-making abnormality of a decision-making algorithm of the unmanned driving device, this disclosure provides a data noise reduction method. When the data noise reduction method is executed, after point cloud data of a surrounding environment of the unmanned driving device is obtained by using a laser radar (or another sensor device having a working principle similar to that of the laser radar), noise corresponding to the micro particles is recognized from the point cloud data and the noise is removed, to reduce the quantity of noise included in the acquired point cloud data, to further reduce an impact of point cloud data of the micro particles such as rain, snow, or raised dust on a decision-making result of the decision-making algorithm.

It should be noted that, the data noise reduction method in this disclosure may be executed by the unmanned driving device, or may be executed by a server providing service support for the unmanned driving device. For ease of description, a description is made subsequently by using an example in which the unmanned driving device is an execution entity.

The unmanned driving device may be a device that can implement self-driving such as an unmanned vehicle, a robot, or an automatic delivery device. Based on this, the unmanned driving device applying the data noise reduction method provided in this disclosure can be configured to perform delivery tasks in the field of delivery, for example, service scenarios in which the unmanned driving device is used for express, logistics, and takeout delivery.

In this disclosure, the to-be-processed point cloud data may be point cloud data directly acquired by the unmanned driving device by using a laser radar. Certainly, the unmanned driving device may alternatively preprocess the point cloud data after the point cloud data is acquired, to reduce a data amount of point cloud data participating in subsequent data noise reduction, thereby improving the efficiency of data noise reduction. For example, in most cases, the ground is not an obstacle in a traveling process of the unmanned driving device, but point cloud data acquired by the unmanned driving device in the traveling process may generally still include ground point cloud data, so that before data noise reduction is performed on the acquired point cloud data, the ground point cloud data may be first removed from the acquired point cloud data, to reduce a data amount that needs to be processed in subsequent data noise reduction.

During example implementation, the unmanned driving device obtains the point cloud data acquired by using the laser radar and the unmanned driving device acquires a geographical position on which the point cloud data is based. The unmanned driving device then determines map data corresponding to the geographical position and remove ground point cloud data from the point cloud data according to the map data and three-dimensional coordinates of each point included in the point cloud data, to obtain to-be-processed point cloud data. In this way, after the ground point cloud data in the point cloud data is removed, the quantity of points participating in data noise reduction can be effectively reduced, and calculation resources that need to be consumed in a subsequent data noise reduction process are further reduced, thereby improving the calculation efficiency.

The map data may be a high-definition map, and the high-definition map at least includes: centimeter-level positioning data, road signs, a road shape, and data of a gradient, a curvature, and a heading direction of each lane. A position corresponding to the unmanned driving device in the high-definition map may be determined based on the data in combination with the geographical position when the unmanned driving device acquires the point cloud data. The unmanned driving device then matches the acquired point cloud data with ground data included in the high-definition map, and removes matched ground point cloud data from the point cloud data, to obtain to-be-processed point cloud data.

Certainly, during removing the group point cloud data, point cloud data corresponding to other objects not affecting traveling of the unmanned driving device may be further removed from the acquired point cloud data. For example, the objects may be curbs, flowers and trees, or traffic signs on two sides of a road.

Step S102: Determining, for each point included in the to-be-processed point cloud data, a point feature corresponding to the point, the point feature including at least one of a spatial distribution difference feature between the point and every other adjacent point and a point group distribution feature corresponding to a point group including all points included in a local space in which the point is located.

During example implementation, the unmanned driving device obtains the to-be-processed point cloud data, and determines, for each point, a point feature corresponding to the point. Therefore, the unmanned driving device may recognize whether the point is noise according to the point feature corresponding to each point in the subsequent data noise reduction process, and finally perform noise reduction on the determined noise.

The point feature corresponding to the point may be extracted from three different dimensions. The point feature of the point may at least include: an attribute feature of the point, a spatial distribution difference feature between the point and every other adjacent point, and a point group distribution feature corresponding to a point group including all points included in a local space in which the point is located.

Extraction of the point feature corresponding to the point is described below respectively based on the foregoing three types of point features in combination with specific examples.

1. The Attribute Feature of the Point

In this disclosure, the attribute feature of the point can reflect characteristics of an objected encountered by a light beam emitted by the laser radar. The attribute feature of the point may include: at least one of a position of the point in a three-dimensional space, a laser reflectivity of the point, a ground height of the point, an echo mode of the point, a semantic tag of the point, or a probability that the point belongs to the semantic tag.

The laser reflectivity of the point refers to, after a light beam is emitted onto an object, a laser reflectivity corresponding to the object determined according to an echo of the light beam. In an actual scenario, after the light beam emitted by the laser radar is emitted onto a surface of each object and an echo is obtained, the laser reflectivity determined according to the echo may all fall within a laser reflectivity range corresponding to the object. In this way, for each point in the to-be-processed point cloud data, whether the point is point cloud data (namely, noise) determined based on a reflected echo when the light beam is emitted onto micro particles such as rain, snow, or raised dust may be determined according to the laser reflectivity of the point.

The ground height of the point is a ground height of a position at which the light beam is emitted onto the object. In an actual scenario, the micro particles in this disclosure may be micro particles close to the ground such as spray splashed from the ground, vehicle exhaust, or raised dust, and these micro particles may include a relatively low ground height. In this way, when the ground height corresponding to the point is lower than a set height threshold, the probability that the point is noise is relatively large.

The echo mode of the point refers to the quantity of echoes included by the light beam corresponding to the point. In an actual scenario, a volume of the micro particles such as rain, snow, or raised dust is relatively small and a corresponding cross-sectional area is also relatively small, and a volume of an obstacle that can affect normal traveling of the unmanned driving device is relatively large and a corresponding cross-sectional area is also relatively large. When the light beam is emitted onto the micro particles, the light beam includes a certain cross-sectional area, if the micro particles cannot block the entire light beam, a part of the light beam may necessarily pass through the micro particles and continue to move forward, leading to an increase in the quantity of echoes corresponding to the light beam. Comparatively speaking, when the light beam is emitted onto an obstacle, the cross-sectional area of the obstacle is generally greater than the cross-sectional area of the light beam, in this case, most light beam may be directly reflected, and only a small part of the light beam may include a plurality of echoes. As can be known based on this, a greater quantity of echoes corresponding to the light beam indicates a greater probability that the point is noise formed by the micro particles such as rain, snow, or raised dust.

It should be noted that, the attribute features of the point mentioned above may all be directly obtained from the to-be-processed point cloud data. In addition, in this disclosure, another part of attribute features in the attribute features of the point needs to be determined by the unmanned driving device through data processing on the to-be-processed point cloud data and according to an obtained data processing result. For example, the another part of attribute features includes the semantic tag of the point and the probability that the point belongs to the semantic tag.

When determining the semantic tag of the point and the probability that the point belongs to the semantic tag, the unmanned driving device may perform obstacle segmentation on the to-be-processed point cloud data to obtain a plurality of pieces of obstacle point cloud data. The unmanned driving device then inputs, for each obstacle point cloud data, the obstacle point cloud data into a pre-trained semantic recognition model, to obtain a semantic tag corresponding to the obstacle point cloud data and a probability that the obstacle point cloud data belongs to the semantic tag. The unmanned driving device then may store, for each point in the obstacle point cloud data, the semantic tag corresponding to the obstacle point cloud data to which the point belongs as a semantic tag of the point, and store the probability that the obstacle point cloud data to which the point belongs to the semantic tag as a probability that the point belongs to the semantic tag.

It should be noted that, when obstacle segmentation is performed, point cloud data corresponding to the micro particles such as rain, snow, or raised dust may also be segmented to obtain a plurality of pieces of segmented point cloud data. For each segmented point cloud data, the point cloud data is inputted into the pre-trained semantic recognition model to obtain a semantic recognition result. In this case, the semantic recognition model may be incapable of recognizing a semantic tag corresponding to the point cloud data, or recognizing the semantic tag corresponding to the point cloud data, but the probability that the point cloud data belongs to the semantic tag is low. The semantic tag may include a category of obstacles that can affect normal traveling of the unmanned driving device.

2. The Spatial Distribution Difference Feature Between the Point and Every Other Adjacent Point When determining the spatial distribution difference feature between the point and every other adjacent point, the unmanned driving device first determines, for each point, other points adjacent to the point from the to-be-processed point cloud data, and then determines the spatial distribution difference feature between the point and every other adjacent point according to point cloud information corresponding to every other point and point cloud information corresponding to the point. The point cloud information corresponding to the point may include three-dimensional coordinates of the point, a ground height of the point, and a laser reflectivity of the point.

For each point, the other adjacent points of the point may be points acquired by other laser emitters adjacent to a laser emitter corresponding to the point at the same moment when the point is acquired; and/or points acquired by the laser emitter corresponding to the point in a scanning period adjacent to an acquisition moment of the point.

Figure 2A:
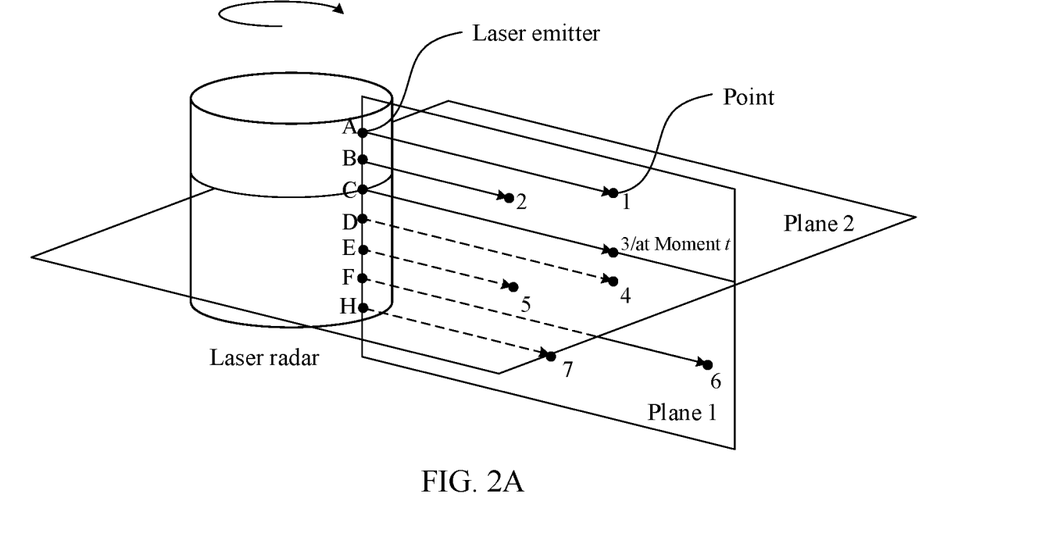
FIG. 2A and FIG. 2B are schematic diagrams of determining other adjacent points of a point according to an embodiment of this disclosure.
Figure 2B:
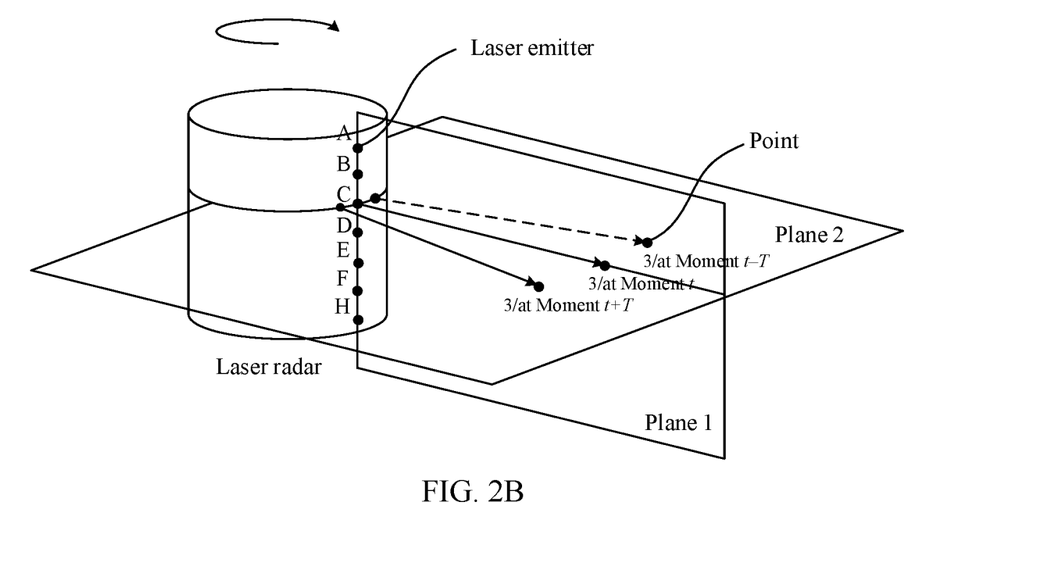

For example, as shown in FIG. 2A and FIG. 2B, the laser radar includes a column of laser emitters arranged vertically, and when the laser radar acquires point cloud data of obstacles, a surrounding environment of the unmanned driving device is scanned in a rotation manner in a direction perpendicular to an arrangement direction of the laser emitters. In this way, for a point 3 acquired at a moment t, the point 3 corresponds to a laser emitter C, and there are a laser emitter B and a laser emitter D adjacent to the laser emitter C in a vertical direction. In this way, in a plane (plane 1) formed by light beams, a point 2 corresponding to the laser emitter B and a point 4 corresponding to the laser emitter D are other points adjacent to the point 3 (referring to FIG. 2A). For the point 3 at the moment t, in a plane (plane 2)

formed by light beams emitted by the laser emitter C, a point 3 at a moment t−T and a point 3 at a moment t+T may be found as other points adjacent to the point 3 (referring to FIG. 2B) from two sides of the light beam corresponding to the point 3, where T is a minimum period of the laser emitter emitting light beams.

Further, after other points adjacent to the point are determined, the unmanned driving device may determine, for the point, the spatial distribution difference feature between the point and every other adjacent point.

The spatial distribution difference feature between the point and every other adjacent point may at least include at least one of a spatial distribution difference feature between the point and every other point in spatial position and a spatial distribution difference feature between the point and every other point in laser reflectivity.

During example implementation, when determining the spatial distribution difference feature between the point and every other point in spatial position, the unmanned driving device determines the spatial distribution difference feature between the point and every other point in spatial position according to three-dimensional coordinates corresponding to the point and three-dimensional coordinates corresponding to every other point. The spatial distribution difference feature between the point and every other point in spatial position may include: a ground height difference between the point and every other point, a Euclidean distance between the point and every other point, and a degree of collinearity between the point and every other point.

In this disclosure, spatial distribution of the micro particles such as rain, snow, or raised dust is relatively loose, when the light beam is emitted onto the micro particles, for any point therein, a ground height difference between the point and every other adjacent point is relatively large, a Euclidean distance difference between the point and other adjacent points is relatively large, and a degree of collinearity among the point and any two adjacent points is relatively poor. However, for an obstacle that can affect normal traveling of the unmanned driving device, one surface of the obstacle necessarily faces toward the unmanned driving device, and when the light beam is emitted onto the surface of the obstacle, the ground height difference and the Euclidean distance difference between the point and every other adjacent point are both relatively small, and the degree of collinearity among the point and other adjacent points is relatively good.

For example, there is a point A, other points corresponding to the point include a point B, a point C, a point D, and a point E. When the ground height difference between the point A and every other point is relatively large, the Euclidean distance difference between the point and other points is relatively large, and the point A and any two points in all other points are not collinear, the point A is most likely to be noise.

In addition to recognizing the noise point from the to-be-processed point cloud data according to the spatial distribution difference feature between the point and every other point in spatial position, this disclosure may further determine, for each point, a laser reflectivity of the point and a laser reflectivity of another corresponding point, and the spatial distribution difference feature in laser reflectivity, to recognize noise from the to-be-processed point cloud data.

In one embodiment, the unmanned driving device determines the laser reflectivity corresponding to every other point and the laser reflectivity corresponding to the point according to the to-be-processed point cloud data, and then determines the spatial distribution difference feature between the point and every other point in laser reflectivity according to the laser reflectivity corresponding to every other point and the laser reflectivity corresponding to the point.

For example, if the reflectivity of the point A is a, other points corresponding to the point include a point B, a point C, a point D, and a point E, and reflectivities of all other points are b, the point A may be noise such as rain, snow, or sand dust between obstacles of the point B, the point C, the point D, and the point E and the unmanned driving device.

3. The Point Group Distribution Feature Corresponding to the Point Group Formed by all Points Included in the Local Space in which the Point is Located When determining the point group distribution feature corresponding to the point group formed by all points included in the local space in which the point is located, the unmanned driving device determines, according to predetermined grids, a grid in which the point is located as the local space in which the point is located, then determines a point group formed by all points included in the local space in which the point is located, and finally determines the point group distribution feature corresponding to the point group according to the to-be-processed point cloud data.

During example implementation, the unmanned driving device needs to segment a space corresponding to the to-be-processed point cloud data according to predetermined grid segmentation precision to obtain the predetermined grids. In this disclosure, for three dimensions corresponding to the three-dimensional coordinates of the point, segmentation may be performed on the space corresponding to the to-be-processed point cloud data by using the corresponding grid segmentation precision respectively to obtain a plurality of predetermined grids with consistent volumes.

Certainly, in this disclosure, when the data noise reduction method is performed, recognition is performed for each point. Therefore, to further reduce a data amount that needs to be processed, in this disclosure, a projection plane may be first determined, grid segmentation lines are determined in the projection plane by using the predetermined grid segmentation precision, and segmentation planes perpendicular to the projection plane is made based on the grid segmentation lines, to segment the space corresponding to the to-be-processed point cloud data, to obtain the predetermined grids.

Figure 3A:
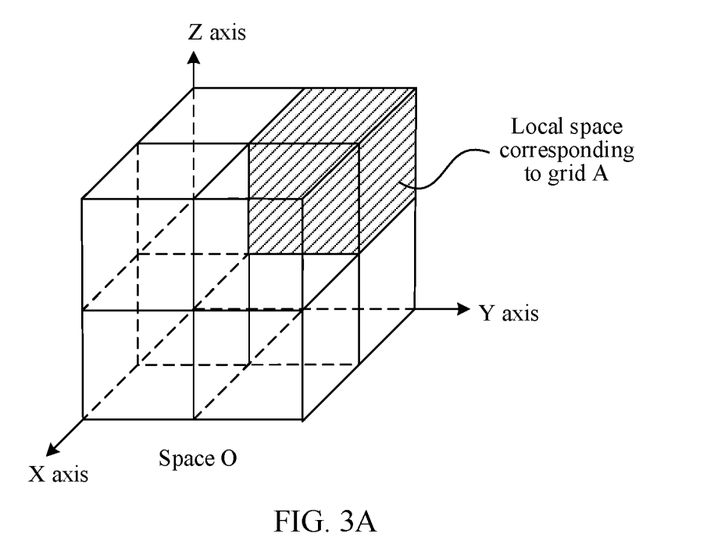
FIG. 3A and FIG. 3B are schematic diagrams of determining a local space in which a point is located according to an embodiment of this disclosure.

For example, in a space O shown in FIG. 3A, the space O is segmented in an X axis direction, a Y axis direction, and a Z axis direction respectively according to the predetermined grid segmentation precision, to obtain 8 grids, and each grid corresponds to a unique local space. For a point, when a point group corresponding to the point is determined, a grid into which the point falls is first determined according to three-dimensional coordinates of the point, if the grid is a grid A (a shadow part shown in the figure), a local space in which the point is located is a local space corresponding to the grid A; and all points included in the determined local space form a point group, to obtain the point group formed by all points included in the local space in which the point is located.

Figure 3B:
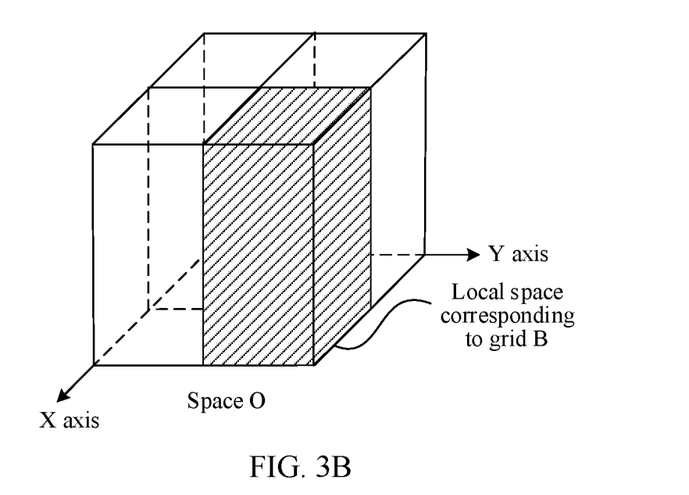

For example, in a space shown in FIG. 3B, a plane determined according to an X axis and a Y axis is used as a projection plane, and the projection plane is segmented according to the grid segmentation precision in an X axis direction and a Y axis direction in the projection plane, to obtain a plurality of grid segmentation lines. Segmentation planes perpendicular to the projection plane are then made according to the grid segmentation lines to segment the space O, to obtain 4 grids, and each grid corresponds to a unique local space. For a point, when a point group corresponding to the point is determined, a grid into which the point falls is first determined according to three-dimensional coordinates of the point, if the grid is a grid B (a shadow part shown in the figure), a local space in which the point is located is a local space corresponding to the grid B; and all points included in the determined local space form a point group, to obtain the point group formed by all points included in the local space in which the point is located.

Further, after determining the point group formed by all points included in the local space in which the point is located, the unmanned driving device may determine the point group distribution feature corresponding to the point group.

The point group distribution feature corresponding to the point group may at least include at least one of a point group distribution feature corresponding to the point group in spatial position and a point group distribution feature corresponding to the point group in laser reflectivity.

During example implementation, when determining the point group distribution feature corresponding to the point group in spatial position, the unmanned driving device determines the point group distribution feature corresponding to the point group in spatial position according to the quantity of points included in the point group and/or three-dimensional coordinates of the points included in the point group. Meanwhile, when determining the point group distribution feature corresponding to the point group in laser reflectivity, the unmanned driving device first determines a laser reflectivity corresponding to each point included in the point group according to the to-be-processed point cloud data, and then determines the point group distribution feature corresponding to the point group in laser reflectivity according to the laser reflectivity corresponding to each point included in the point group.

The point group distribution feature corresponding to the point group in spatial position at least includes the quantity of points included in the point group, a point density corresponding to the point group, and ground height distribution of the points included in the point group.

In this disclosure, compared with obstacles, a spatial density of the micro particles such as rain, snow, or raised dust is relatively small, and if the quantity of points included in the local space corresponding to the grid is smaller or the point density is lower, the points in the local space are more likely to be noise. If the points in the local space are points of an obstacle, most light beams emitted to the obstacle may be reflected after being emitted onto the obstacle, the points are relatively dense, so that the quantity of points in the local space will also be relatively large.

If it is determined that the ground height distribution of the points included in the point group does not include a uniformly discretely distributed ground height interval, the points in the local space are more likely to be noise. If the points in the local space are points of an obstacle, most light beams emitted to the obstacle may be reflected after being emitted onto the obstacle, and in this way, the ground heights of the points emitted onto the obstacle in the form of a dot matrix are uniformly discretely distributed.

Further, the point group distribution feature corresponding to the point group in laser reflectively may represent a possibility that the points in the point group belong to noise. For example, if laser reflectivities of the points in the point group all fall within a laser reflectivity value range of rainwater, the points in the point group are all most likely to be noise. If the laser reflectivities of the points in the point group all fall within a laser reflectivity value range of car paint, the points in the point group are all most likely to be an obstacle. During specific implementation, whether the points in the point group tend to noise or an obstacle may be further determined according to an average value (or a variance or a standard deviation) of the laser reflectivities of all the points in the point group.

Step S104: Recognizing a noise point from the to-be-processed point cloud data according to the point feature corresponding to each point in the to-be-processed point cloud data.

During example implementation, after determining the point feature corresponding to the point, the unmanned driving device recognize noise from the to-be-processed point cloud data according to the point feature, to help perform noise reduction on the to-be-processed point cloud data.

In this disclosure, the unmanned driving device may recognize noise from the to-be-processed point cloud data in many manners.

For example, the unmanned driving device may determine, for each point in the to-be-processed point cloud data, whether a feature value of the point feature corresponding to the point does not fall within a set feature value range, and if it is determined that the feature value does not fall within the set feature value range, the point is recognized as noise. In this solution, according to the point feature of each point, the point whose feature value corresponding to the point feature is apparently represented as noise is recognized, to perform noise reduction.

In another example, the unmanned driving device may input, for each point in the to-be-processed point cloud data, the point feature corresponding to the point into a pre-trained noise recognition model to recognize noise from the to-be-processed point cloud data. In this solution, point cloud data of points with tags needs to be used, and the point feature is extracted from the point cloud data of each point to pre-train the noise recognition model. The trained noise recognition model is then used to perform noise recognition on each point in the to-be-processed point cloud data, to determine noise from the to-be-processed point cloud data and remove the noise from the to-be-processed point cloud data, to achieve noise reduction. The noise recognition model may be implemented by using a machine learning model such as a support vector machine (SVM), a random forest, a neural network, an XGBoost classifier.

Certainly, in this disclosure, the foregoing two noise recognition methods may be combined for use. Specifically, the unmanned driving device may, for each point in the to-be-processed point cloud data, recognize the point as noise in a case of determining that a feature value of the point feature corresponding to the point does not fall within the set feature value range. The unmanned driving device then determines each point that is not recognized as noise in the to-be-processed point cloud data, and inputs the point feature corresponding to each point into the pre-trained noise recognition model, to further recognize noise from the points that are not recognized as noise.

Step S106: Performing noise reduction on the to-be-processed point cloud data according to the recognized noise point.

During example implementation, after recognizing the noise, the unmanned driving device removes the recognized noise point from the to-be-processed point cloud data to obtain target point cloud data, and then inputs the target point cloud data into a predetermined target object recognition model, to recognize point cloud data corresponding to each target object from the target point cloud data. Further, other point cloud data than the recognized point cloud data corresponding to each target object is removed from the target point cloud data to obtain to-be-processed point cloud data after noise reduction.

The target point cloud data is to-be-processed point cloud data obtained after recognizing the noise point from the to-be-processed point cloud data according to the point feature of each point and removing the recognized noise point. The target object recognition model may be an obstacle recognition model. The unmanned driving device may recognize obstacles included in the to-be-processed point cloud data from the target point cloud data by using the target object recognition model, and may perform further noise reduction on the target point cloud data based on the recognized obstacles, to obtain more accurate obstacle point cloud data, to meet requirements of subsequent data processing.

For example, when a vehicle travels a water-accumulated road segment in a rainy day, a lower part of a vehicle body includes a large amount of spray. If point cloud data corresponding to spray that is relatively close to the vehicle body is not recognized as noise when noise reduction is performed according to the point feature of each point, the target point cloud data from which the recognized noise point is removed may be inputted into the predetermined target object recognition model, to recognize obstacles from the target point cloud data, and then noise corresponding to the spray near the vehicle body is further removed according to outlines of the recognized obstacles.

Based on the foregoing steps, after the to-be-processed point cloud data is obtained, the unmanned driving device may recognize noise with a relatively loose distribution condition compared with real obstacles from the point cloud data according to an attribute feature of each point in the point cloud data, a distribution difference feature between each point in space, and a distribution condition of the attribute feature of each point in space, and performs noise reduction, to reduce the quantity of noise included in the point cloud data, to further reduce an impact of point cloud data of micro particles such as rain, snow, or raised dust on a decision-making result of a decision-making algorithm, thereby improving the accuracy of decision-making of the decision-making algorithm.

Figure 4:
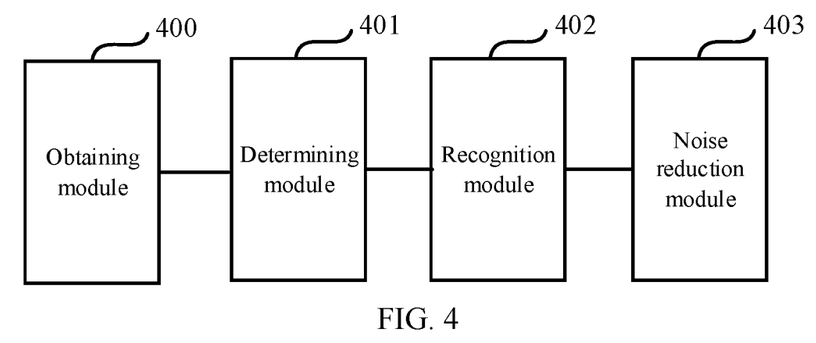
FIG. 4 is a schematic diagram of a data noise reduction apparatus according to this disclosure.

The foregoing is the data noise reduction method according to one or more embodiments of this disclosure, and based on the same concept, as shown in FIG. 4, this disclosure further provides a corresponding data noise reduction apparatus.

FIG. 4 is a schematic diagram of a data noise reduction apparatus according to this disclosure, and the apparatus specifically includes:

an obtaining module 400, configured to obtain to-be-processed point cloud data;

a determining module 401, configured to determine, for each point included in the to-be-processed point cloud data, a point feature corresponding to the point, the point feature including at least one of a spatial distribution difference feature between the point and every other adjacent point and a point group distribution feature corresponding to a point group including all points included in a local space in which the point is located;

a recognition module 402, configured to recognize noise from the to-be-processed point cloud data according to the point feature corresponding to each point in the to-be-processed point cloud data; and a noise reduction module 403, configured to perform noise reduction on the to-be-processed point cloud data according to the recognized noise point.

In some embodiments, the to-be-processed point cloud data is acquired by a laser radar, and the laser radar includes a plurality of laser emitters; and the other adjacent points of the point include: points acquired by other laser emitters adjacent to a laser emitter corresponding to the point at the same moment when the point is acquired; and/or points acquired by the laser emitter corresponding to the point in a scanning period adjacent to an acquisition moment of the point.

In some embodiments, when the point feature includes the spatial distribution difference feature between the point and every other point, the determining module 401 is specifically configured to determine a spatial distribution difference feature between the point and every other point in spatial position according to three-dimensional coordinates corresponding to the point and three-dimensional coordinates corresponding to every other point.

In some embodiments, when the point feature includes the spatial distribution difference feature between the point and every other point, the determining module 401 is specifically configured to determine a laser reflectivity corresponding to every other point and a laser reflectivity corresponding to the point according to the to-be-processed point cloud data; and determine the spatial distribution difference feature between the point and every other point in laser reflectivity according to the laser reflectivity corresponding to every other point and the laser reflectivity corresponding to the point.

In some embodiments, when the point feature includes the point group distribution feature corresponding to the point group formed by all points included in the local space in which the point is located, the determining module 401 is specifically configured to determine, according to predetermined grids, a grid in which the point is located as the local space in which the point is located; determine a point group formed by all points included in the local space in which the point is located; and determine the point group distribution feature corresponding to the point group according to the to-be-processed point cloud data.

In some embodiments, the determining module 401 is specifically configured to determine the point group distribution feature corresponding to the point group in spatial position according to the quantity of points included in the point group and/or three-dimensional coordinates of each point included in the point group.

In some embodiments, the determining module 401 is specifically configured to determine a laser reflectivity corresponding to each point included in the point group according to the to-be-processed point cloud data; and determine the point group distribution feature corresponding to the point group in laser reflectivity according to the laser reflectivity corresponding to each point included in the point group.

In some embodiments, the recognition module 402 is specifically configured to, for each point in the to-be-processed point cloud data, recognize the point as noise in a case of determining that a feature value of the point feature corresponding to the point does not fall within a set feature value range.

In some embodiments, the recognition module 402 is specifically configured to, for each point in the to-be-processed point cloud data, input the point feature corresponding to the point into a pre-trained noise recognition model to recognize noise from the to-be-processed point cloud data.

In some embodiments, the noise reduction module 403 is specifically configured to remove the recognized the noise point from the to-be-processed point cloud data to obtain target point cloud data; input the target point cloud data into a predetermined target object recognition model to recognize point cloud data corresponding to each target object from the target point cloud data; and remove other point cloud data than the recognized point cloud data corresponding to each target object from the target point cloud data to obtain to-be-processed point cloud data after noise reduction.

This disclosure further provides a computer-readable storage medium, storing a computer program, the computer program being used for implementing the data noise reduction method according to FIG. 1.

Figure 5:
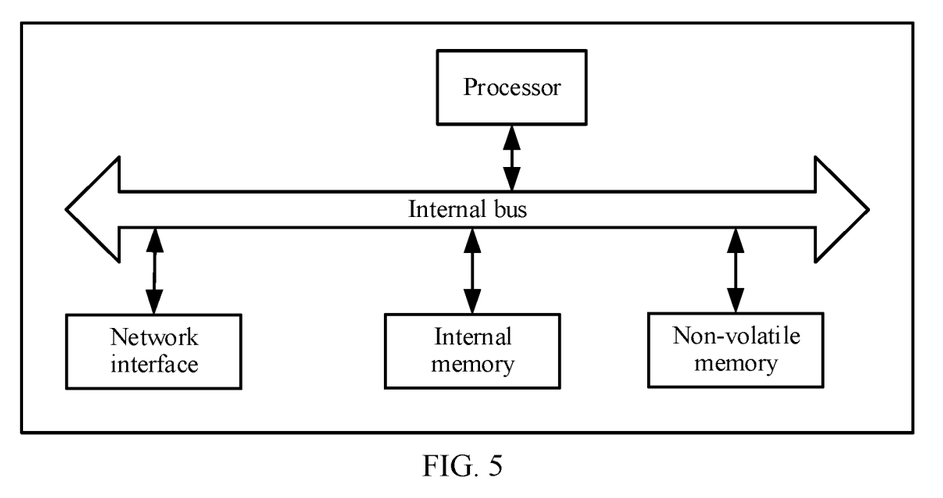
FIG. 5 is a schematic diagram of an unmanned driving device corresponding to FIG. 1 according to this disclosure.

This disclosure further provides a schematic structural diagram of an unmanned driving device shown in FIG. 5. As shown in FIG. 5, at the hardware level, the unmanned driving device includes a processor, an internal bus, a network interface, an internal memory, and a non-volatile memory, and certainly may further include hardware required for other services. The processor reads a corresponding computer program from the non-volatile memory into the internal memory and then runs the computer program, to implement the data noise reduction method described in FIG. 1. Definitely, in addition to a software implementation, this disclosure does not exclude other implementations, for example, a logic device or a combination of software and hardware. In other words, an entity executing the following processing procedure is not limited to the logic units, and may also be hardware or logic devices.

In the 1990s, improvements in a technology can be clearly categorized as hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. In addition, instead of making an integrated circuit chip manually, the programming is mostly implemented by using "logic compiler" software, which is similar to the software compiler used to write programs. Original code before compiling is also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner. For example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing, by logically programming the method steps, the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module, or the unit described in the foregoing embodiments may be specifically implemented by a computer chip or an entity, or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of this disclosure, the functions of the units may be implemented in the same piece of or a plurality of pieces of software and/or hardware.

A person skilled in the art should understand that the embodiments of the present invention may be provided as a method, a system, or a computer program product. Therefore, the present invention may use a form of hardware-only embodiments, software-only embodiments, or embodiments with a combination of software and hardware. Moreover, the present invention may use a form of a computer program product that is implemented on one or more computer-usable storage media (including but not limited to a disk memory, a compact disc read-only memory (CD-ROM), an optical memory, and the like) that include computer-usable program code.

The present invention is described with reference to the flowcharts and/or block diagrams of the method, the device (system), and the computer program product according to the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output (I/O) interface, a network interface, and an internal memory.

The memory may include a form such as a volatile memory, a random access memory (RAM), and/or a nonvolatile memory such as a read-only memory (ROM) or a flash memory (flash RAM) in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a computer storage medium include but are not limited to a phase-change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette tape, a magnetic tape, a magnetic disk storage or other magnetic storage device, or any other non-transmission medium, which may be configured to store information accessible by a computing device. Based on the definition in this disclosure, the computer-readable medium does not include transitory computer-readable media (transitory media), such as a modulated data signal and a carrier.

It should be further noted that the terms "include", "comprise", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

This disclosure can be described in the general context of computer-executable instructions executed by a computer, for example, program modules. Generally, the program module includes a routine, a program, an object, a component, a data structure, and the like for executing a particular task or implementing a particular abstract data type. This disclosure may also be implemented in a distributed computing environment in which tasks are performed by remote processing devices connected by using a communication network. In a distributed computing environment, the program module may be located in both local and remote computer storage media including storage devices.

The embodiments of this disclosure are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The descriptions are merely some embodiments, and are not intended to limit this disclosure. For a person skilled in the art, various modifications and changes may be made to this disclosure. Any modification, equivalent replacement, and improvement made within the spirit and principle of this disclosure shall fall within the scope of the claims of this disclosure.

The invention claimed is:

1. A data noise reduction method, comprising:
   obtaining to-be-processed point cloud data;
   for each of points in the to-be-processed point cloud data, determining a point feature corresponding to the point, the point feature comprising at least one of a spatial distribution difference feature between the point and other points adjacent to the point or a point group distribution feature corresponding to a point group comprising all points in a local space in which the point is located;
   recognizing a noise point from the to-be-processed point cloud data according to point features corresponding to the points in the to-be-processed point cloud data; and
   performing noise reduction on the to-be-processed point cloud data according to the recognized noise point; and, wherein performing noise reduction on the to-be-processed point cloud data according to the recognized noise point comprises:
   removing the recognized noise point from the to-be-processed point cloud data to obtain target point cloud data;
   inputting the target point cloud data into a predetermined target object recognition model to recognize point cloud data corresponding to one or more target objects from the target point cloud data; and
   removing other point cloud data than the recognized point cloud data corresponding to the one or more target objects from the target point cloud data to obtain to-be-processed point cloud data after noise reduction.

2. The method according to claim 1, wherein the to-be-processed point cloud data is acquired by a laser radar comprising a plurality of laser emitters; and, wherein
the other points adjacent to the point comprise:
points acquired by other laser emitters adjacent to a laser emitter corresponding to the point at a moment when the point is acquired; and/or
points acquired by the laser emitter corresponding to the point in a scanning period adjacent to the moment when the point is acquired.

3. The method according to claim 2, wherein when the point feature comprises the spatial distribution difference feature between the point and the other points adjacent to the point, determining the point feature corresponding to the point comprises:
determining the spatial distribution difference feature between the point and the other points in spatial position according to three-dimensional coordinates corresponding to the point and three-dimensional coordinates corresponding to the other points.

4. The method according to claim 2, wherein when the point feature comprises the spatial distribution difference feature between the point and the other points adjacent to the point, determining the point feature corresponding to the point comprises:
determining a laser reflectivity corresponding to each of the other points and a laser reflectivity corresponding to the point according to the to-be-processed point cloud data; and
determining the spatial distribution difference feature between the point and the other points in laser reflectivity according to the laser reflectivities corresponding to the other points and the laser reflectivity corresponding to the point.

5. The method according to claim 1, wherein when the point feature comprises the point group distribution feature corresponding to the point group comprising all points in the local space in which the point is located, determining the point feature corresponding to the point comprises:
determining, according to predetermined grids, a grid in which the point is located, as the local space in which the point is located;
determining the point group comprising all points in the local space in which the point is located; and
determining the point group distribution feature corresponding to the point group according to the to-be-processed point cloud data.

6. The method according to claim 5, wherein determining the point group distribution feature corresponding to the point group according to the to-be-processed point cloud data comprises:
determining the point group distribution feature corresponding to the point group in spatial position according to a quantity of points comprised in the point group and/or three-dimensional coordinates of the points comprised in the point group.

7. The method according to claim 5, wherein determining the point group distribution feature corresponding to the point group according to the to-be-processed point cloud data comprises:
determining a laser reflectivity corresponding to each of the points in the point group according to the to-be-processed point cloud data; and
determining the point group distribution feature corresponding to the point group in laser reflectivity according to the laser reflectivity corresponding to each of the points in the point group.

8. The method according to claim 1, wherein recognizing a noise point from the to-be-processed point cloud data according to the point features corresponding to the points in the to-be-processed point cloud data comprises:
for each of points in the to-be-processed point cloud data, in response to determining that a feature value of the point feature corresponding to the point does not fall within a predetermined feature value range, recognizing the point as a noise point.

9. The method according to claim 1, wherein recognizing a noise point from the to-be-processed point cloud data according to the point features corresponding to the points in the to-be-processed point cloud data comprises:
for each of the points in the to-be-processed point cloud data, inputting the point feature corresponding to the point into a pre-trained noise recognition model to recognize a noise point from the to-be-processed point cloud data.

10. An unmanned driving device, comprising a memory, a processor, and a computer program stored in the memory and executable on the processor, the processor, when executing the program, implementing operations:
obtaining to-be-processed point cloud data;
for each of points in the to-be-processed point cloud data, determining a point feature corresponding to the point, the point feature comprising at least one of a spatial distribution difference feature between the point and other points adjacent to the point or a point group distribution feature corresponding to a point group comprising all points in a local space in which the point is located;
recognizing a noise point from the to-be-processed point cloud data according to point features corresponding to the points in the to-be-processed point cloud data; and
performing noise reduction on the to-be-processed point cloud data according to the recognized noise point; and, wherein performing noise reduction on the to-be-processed point cloud data according to the recognized noise point comprises:
removing the recognized noise point from the to-be-processed point cloud data to obtain target point cloud data;
inputting the target point cloud data into a predetermined target object recognition model to recognize point cloud data corresponding to one or more target objects from the target point cloud data; and
removing other point cloud data than the recognized point cloud data corresponding to the one or more target objects from the target point cloud data to obtain to-be-processed point cloud data after noise reduction.

11. The device according to claim 10, wherein the to-be-processed point cloud data is acquired by a laser radar comprising a plurality of laser emitters; and, wherein
the other points adjacent to the point comprise:
points acquired by other laser emitters adjacent to a laser emitter corresponding to the point at a moment when the point is acquired; and/or
points acquired by the laser emitter corresponding to the point in a scanning period adjacent to the moment when the point is acquired.

12. The device according to claim 11, wherein when the point feature comprises the spatial distribution difference feature between the point and the other points adjacent to the point, determining the point feature corresponding to the point comprises:

determining the spatial distribution difference feature between the point and the other points in spatial position according to three-dimensional coordinates corresponding to the point and three-dimensional coordinates corresponding to the other points.

13. The device according to claim 11, wherein when the point feature comprises the spatial distribution difference feature between the point and the other points adjacent to the point, determining the point feature corresponding to the point comprises:

determining a laser reflectivity corresponding to each of the other points and a laser reflectivity corresponding to the point according to the to-be-processed point cloud data; and     determining the spatial distribution difference feature between the point and the other points in laser reflectivity according to the laser reflectivities corresponding to the other points and the laser reflectivity corresponding to the point.

14. The device according to claim 10, wherein when the point feature comprises the point group distribution feature corresponding to the point group comprising all points in the local space in which the point is located, determining the point feature corresponding to the point comprises:

determining, according to predetermined grids, a grid in which the point is located, as the local space in which the point is located;

determining the point group comprising all points in the local space in which the point is located; and     determining the point group distribution feature corresponding to the point group according to the to-be-processed point cloud data.

15. The device according to claim 14, wherein determining the point group distribution feature corresponding to the point group according to the to-be-processed point cloud data comprises:

determining the point group distribution feature corresponding to the point group in spatial position according to a quantity of points comprised in the point group and/or three-dimensional coordinates of the points comprised in the point group.

16. The device according to claim 14, wherein determining the point group distribution feature corresponding to the point group according to the to-be-processed point cloud data comprises:

determining a laser reflectivity corresponding to each of the points in the point group according to the to-be-processed point cloud data; and     determining the point group distribution feature corresponding to the point group in laser reflectivity according to the laser reflectivity corresponding to each of the points in the point group.

17. The device according to claim 10, wherein recognizing a noise point from the to-be-processed point cloud data according to the point features corresponding to the points in the to-be-processed point cloud data comprises:

for each of points in the to-be-processed point cloud data, in response to determining that a feature value of the point feature corresponding to the point does not fall within a predetermined feature value range, recognizing the point as a noise point.

18. The device according to claim 10, wherein recognizing a noise point from the to-be-processed point cloud data according to the point features corresponding to the points in the to-be-processed point cloud data comprises:

for each of the points in the to-be-processed point cloud data, inputting the point feature corresponding to the point into a pre-trained noise recognition model to recognize a noise point from the to-be-processed point cloud data.

19. A non-transitory computer-readable storage medium, storing a computer program such that when the computer program is executed by a processor, the processor is caused to perform:

obtaining to-be-processed point cloud data;

for each of points in the to-be-processed point cloud data, determining a point feature corresponding to the point, the point feature comprising at least one of a spatial distribution difference feature between the point and other points adjacent to the point or a point group distribution feature corresponding to a point group comprising all points in a local space in which the point is located;

recognizing a noise point from the to-be-processed point cloud data according to point features corresponding to the points in the to-be-processed point cloud data; and     performing noise reduction on the to-be-processed point cloud data according to the recognized noise point; and, wherein performing noise reduction on the to-be-processed point cloud data according to the recognized noise point comprises:

removing the recognized noise point from the to-be-processed point cloud data to obtain target point cloud data;

inputting the target point cloud data into a predetermined target object recognition model to recognize point cloud data corresponding to one or more target objects from the target point cloud data; and     removing other point cloud data than the recognized point cloud data corresponding to the one or more target objects from the target point cloud data to obtain to-be-processed point cloud data after noise reduction.

* * * * *